(12) United States Patent
Van Egmond et al.

(10) Patent No.: US 8,604,118 B2
(45) Date of Patent: Dec. 10, 2013

(54) ANTIFOULANT FOR IMPACT COPOLYMERS AND METHOD

(75) Inventors: Jan W. Van Egmond, Charleston, WV (US); Roger B. Painter, Rosharon, TX (US); Zuzanna Kulik, South Charleston, WV (US); Joel D. Wieliczko, Channahon, IL (US)

(73) Assignee: Dow Global Technologies LLC, Midland, MI (US)

( * ) Notice: Subject to any disclaimer, the term of this patent is extended or adjusted under 35 U.S.C. 154(b) by 387 days.

(21) Appl. No.: 12/643,651

(22) Filed: Dec. 21, 2009

(65) Prior Publication Data

US 2010/0167058 A1 Jul. 1, 2010

Related U.S. Application Data

(60) Provisional application No. 61/140,909, filed on Dec. 26, 2008.

(51) Int. Cl.
*C08F 10/00* (2006.01)
*C08F 2/00* (2006.01)

(52) U.S. Cl.
USPC .............................................. 524/457; 524/80

(58) Field of Classification Search
USPC ................................................... 524/80, 457
See application file for complete search history.

(56) References Cited

U.S. PATENT DOCUMENTS

2007/0027275 A1 * 2/2007 Chen et al. ...................... 526/65

FOREIGN PATENT DOCUMENTS

| EP | 0490451 | A2 | 6/1992 |
| EP | 0736552 | A2 | 10/1996 |

* cited by examiner

*Primary Examiner* — Kelechi Egwim
(74) *Attorney, Agent, or Firm* — Whyte Hirschboeck Dudek S.C.

(57) ABSTRACT

A process for producing a heterophasic copolymer is provided. The process includes introducing an antifoulant to a second polymerization reactor which operates in series with a first polymerization reactor. The antifoulant may be a multi-component antifoulant and/or a coating agent. Provision of either antifoulant enables the production of a heterophasic copolymer with an Fc value from about 10% to about 50% by inhibiting reactor fouling during polymerization.

13 Claims, 2 Drawing Sheets

Figure 1
Figure 2
Figure 3
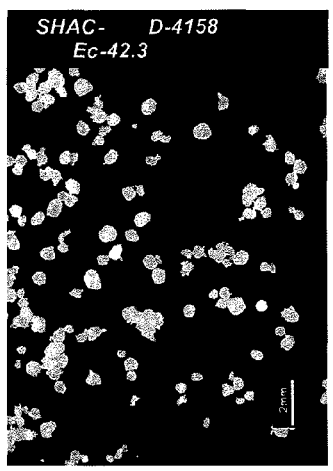
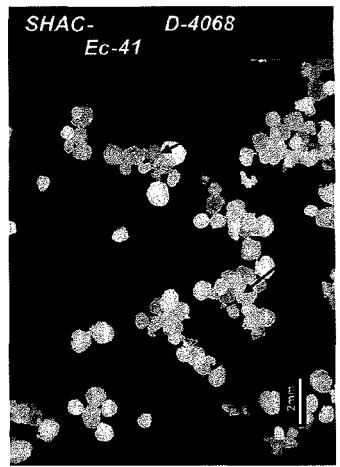
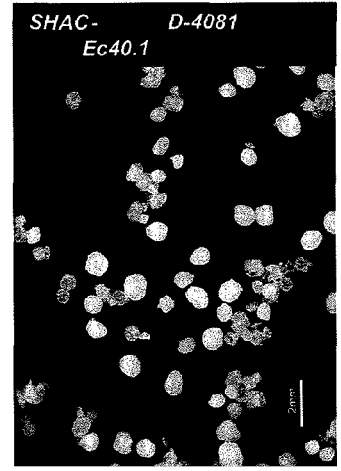

ANTIFOULANT FOR IMPACT COPOLYMERS AND METHOD

PRIORITY CLAIM

This application claims priority to U.S. provisional application Ser. No. 61/140,909 filed on Dec. 26, 2008, the entire content of which is incorporated by reference herein.

BACKGROUND

The present disclosure relates to processes for producing heterophasic copolymers, the processes exhibiting reduced, or no, reactor fouling, and the heterophasic copolymers produced therefrom.

Heterophasic polymers, such as impact copolymers, are characterized by a continuous polymeric phase with a discontinuous polymeric phase dispersed throughout the continuous polymer phase. A conventional impact copolymer production process is conducted in a two stage process. A first polymer (the continuous phase) is produced in one or more reactors. The product of this first stage is then moved from the first reactor to a second reactor where a second polymer (the discontinuous phase) is produced and incorporated within a matrix of the continuous phase forming the impact copolymer.

The second polymer is typically elastomeric or rubbery in nature. This poses many processing difficulties during the second stage. The tackiness and stickiness of the second polymer results in particle agglomeration and/or adhesion of the formed impact copolymer to the walls of the second polymerization reactor and other internal surfaces and structures in operative communication with the second reactor. Such reactor fouling is a particular problem as it causes reactor shut-down, which is detrimental to production efficiency.

Desirable would be the inhibition and/or the elimination of fouling during heterophasic polymer production.

SUMMARY

The present disclosure relates to processes for producing a heterophasic copolymer and the heterophasic copolymers produced from these processes. The processes disclosed herein inhibit reactor fouling during formation of the heterophasic copolymer to enable production of heterophasic copolymers with high rubber content.

In an embodiment, a process for producing a copolymer is provided. The process includes introducing an active polymer from a first polymerization reactor into a second polymerization reactor. The active polymer is contacted with at least one olefin under polymerization conditions in the second polymerization reactor. This forms a heterophasic copolymer having an Fc value from about 10% to about 50%. The process further includes adding a multicomponent antifoulant to the second polymerization reactor at a rate such that the multicomponent antifoulant is present in the heterophasic copolymer in a concentration from about 1 ppm to about 200 ppm.

The present disclosure provides another process. In an embodiment, a process for producing a copolymer is provided which includes introducing an active polymer from a first polymerization reactor into a second polymerization reactor and contacting the active polymer with at least one olefin under polymerization conditions. This forms particles of an impact copolymer in the second reactor. The process also includes adding a coating agent into the second polymerization reactor, and coating the particles with the coating agent.

In an embodiment, an impact copolymer is provided. The impact copolymer includes particles composed of a continuous phase and a discontinuous phase dispersed within the continuous phase. The particles of the impact copolymer also include a coating. The coating is on an exterior surface of the particle.

In an embodiment, the coating includes one or more of the following components: a high molecular weight polyglycol, a dendrimer, a high molecular weight polymer with an electron donating group, an alkoxysilane, an activity limiting agent, and any combination thereof.

In an embodiment, the coating surrounds the entire outer surface, or substantially the entire outer surface, of at least one particle.

In an embodiment, the coating has a thickness from about 0.01 μm to about 200 μm.

The continuous phase can be a propylene homopolymer, a propylene/olefin copolymer, or a propylene/ethylene copolymer. The discontinuous phase can be an ethylene homopolymer, an ethylene/olefin copolymer or a propylene/ethylene copolymer.

In an embodiment, the particles of the impact copolymer include a propylene/ethylene copolymer dispersed in a propylene homopolymer.

In an embodiment, the particles contain no coating agent within an interior portion thereof.

An advantage of the present disclosure is an improved process for producing heterophasic copolymers.

An advantage of the present disclosure is a polymerization process that produces high rubber content impact copolymers with little or no particle adhesion and/or little or no particle agglomeration.

An advantage of the present disclosure is a process for producing a heterophasic copolymer that inhibits—either wholly or partially—reactor fouling.

An advantage of the present disclosure is a heterophasic copolymer production process that reduces production downtime with the inhibition of reactor fouling.

An advantage of the present disclosure is an odor-free impact copolymer containing a large weight percent of rubber phase.

BRIEF DESCRIPTION OF THE DRAWINGS

FIG. 1 is a scanning electron micrograph (SEM) of polymer particles in accordance with an embodiment of the present disclosure.

FIG. 2 is a SEM of polymer particles.

FIG. 3 is a SEM of non-agglomerated polymer particles in accordance with an embodiment of the present disclosure.

DETAILED DESCRIPTION

Figure 4:
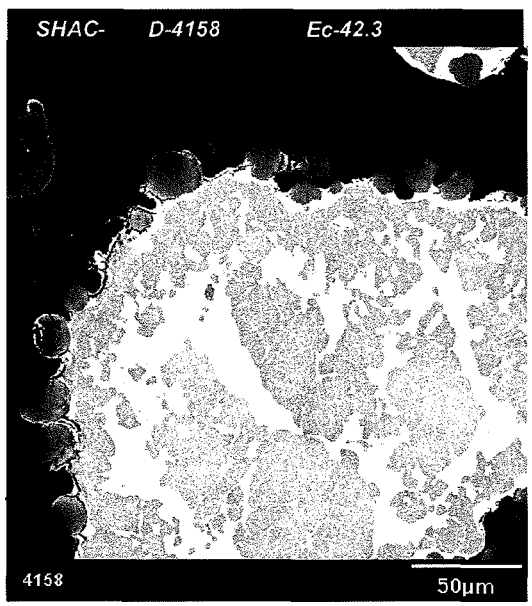
FIG. 4 is an SEM-Backscattered Electron Image (BEI) along a sectional view of a polymer particle coated with polymer fines in accordance with an embodiment of the present disclosure.

The present disclosure is directed to processes for producing heterophasic copolymers, and the polymers produced from these processes.

In an embodiment, a process for producing a copolymer is provided. The process includes introducing an active polymer from a first polymerization reactor into a second polymerization reactor and contacting the active polymer with at least one olefin under polymerization conditions in the second polymerization reactor. This forms a heterophasic copolymer having an Fc value from about 10% to about 50%. The process further includes adding a multicomponent antifoulant to the second polymerization reactor at a rate such that the multicomponent antifoulant is present in the heterophasic copolymer in a concentration from about 1 ppm to about 200 ppm.

As used herein, an "active polymer" is a polymer containing an amount of active catalyst (typically embedded therein) that is capable of further polymerization upon exposure to an olefin under polymerization conditions. The active polymer is the product of a previous polymerization process performed in the first reactor. The active catalyst may be a Ziegler-Nana catalyst, a constrained geometry catalyst, a metallocene catalyst, a metal-centered heteroaryl ligand catalyst, and combinations thereof. In an embodiment, the active catalyst is a Ziegler-Natta catalyst. The active polymer may or may not be produced in the presence of an SCA or ALA/SCA mixture. In another embodiment, the first polymerization reactor and the second polymerization reactor operate in series, whereby the effluent from the first polymerization reactor is charged to the second polymerization reactor and one or more additional (or different) olefin monomer(s) is/are added to the second polymerization reactor to continue polymerization.

The active polymer may be a propylene-based polymer or an ethylene-based polymer. In an embodiment, the active polymer is a propylene-based polymer such as a propylene-olefin copolymer, a propylene-ethylene copolymer, or a propylene homopolymer. In another embodiment, the active polymer is a propylene homopolymer.

In an embodiment, the active polymer includes from about 2 wt % to about 30 wt %, or at least 6 wt % polymer fines. Weight percent is based on the total weight of the particles of active polymer. As used herein, "fines" or "polymer fines" are polymer particles from about 10 nm to about 200 microns in size. The polymer fines may or may not be an active polymer.

As used herein, "polymerization conditions" are temperature and pressure parameters within a polymerization reactor vessel suitable for promoting polymerization between a catalyst and an olefin to form the desired polymer. The output of the reactor is then recovered for post-reaction processing. The polymerization process may be a gas phase polymerization (i.e., fluidized bed polymerization, gas-solid, gas-liquid-solid, and/or liquid-solid phase polymerization), a slurry polymerization (stirred reactors, slurry reactors), or a bulk polymerization process, operating in one, or more than one, reactor. In an embodiment, polymerization occurs by way of two polymerization reactors operating in series.

The present process includes contacting the active polymer with at least one olefin in the second polymerization reactor. One or more olefin monomers can be introduced in the second polymerization reactor to react with the active polymer and to form the heterophasic copolymer. Nonlimiting examples of suitable olefin monomers include ethylene, propylene, $C_{4-20}$ α-olefins, such as 1-butene, 1-pentene, 1-hexene, 4-methyl-1-pentene, 1-heptene, 1-octene, 1-decene, 1-dodecene and the like; $C_{4-20}$ diolefins, such as 1,3-butadiene, 1,3-pentadiene, norbornadiene, 5-ethylidene-2-norbornene (ENB) and dicyclopentadiene; $C_{8-40}$ vinyl aromatic compounds including styrene, o-, m-, and p-methylstyrene, divinylbenzene, vinylbiphenyl, vinylnaphthalene; and halogen-substituted $C_{8-40}$ vinyl aromatic compounds such as chlorostyrene and fluorostyrene.

The active polymer is contacted with at least one olefin in the second polymerization reactor to produce or otherwise form a heterophasic copolymer. As used herein, a "heterophasic copolymer" is a multiple phase polymer having a continuous polymer phase (also referred to as the matrix phase) and a discontinuous polymer phase (also referred to as the elastomeric phase or the rubber phase, or rubber) dispersed within the continuous polymer phase. A heterophasic copolymer may contain more than two polymer phases. One type of a heterophasic copolymer is an impact copolymer. The heterophasic copolymer has an Fc value from about 10% to about 50%. In an embodiment, the heterophasic copolymer has an Fc value greater than about 15%, or greater than about 20%, or greater than about 30%, or greater than about 40%. In a further embodiment, the heterophasic copolymer has an Fc value greater than about 15% to about 50% or greater than 15% to about 40%. As used herein, "fraction copolymer" ("Fc") is the weight percent of the discontinuous phase present in the heterophasic copolymer. The Fc value is based on the total weight of the heterophasic copolymer. As used herein, a "high-rubber" copolymer is a heterophasic copolymer with an Fc value greater than about 30%, or greater than about 30% to about 50%. In an embodiment, the high-rubber copolymer includes a propylene homopolymer continuous phase and a propylene/ethylene copolymer discontinuous phase. The Ec value for the high rubber copolymer may less than about 50%, or from about 10% to less than about 50%, or from about 40% to about 45%.

In an embodiment, the heterophasic copolymer is a propylene impact copolymer with a continuous phase that is a propylene-based polymer and a discontinuous phase that is a propylene/ethylene copolymer. The propylene impact copolymer has an Fc value of greater than 15%, or greater than about 15% to about 50%. Impact copolymers with an Fc greater than 15% are rubbery in nature and have a proclivity toward adhesion making such impact copolymers prone to reactor fouling and/or agglomeration. "Fouling" or "polymer fouling," or "reactor fouling," as used herein, is adhesion of polymer particles to one another (agglomeration) and/or polymer particle adhesion to the inner surfaces of a polymerization reactor and/or polymer particle adhesion to structures that are in operative communication with the polymerization reactor. Nonlimiting examples of reactor components/structures include reactor inner sidewalls, piping, heat exchanger, distributor plate, and compressor.

In an embodiment, the heterophasic copolymer is a sticky polymer. The term "sticky polymer," as used herein, is a polymer, which, although particulate at temperatures below the sticking or softening temperature, agglomerates at temperatures above the sticking or softening temperature. The term "sticking temperature", is defined as the temperature at which fluidization or stirring ceases due to excessive agglomeration of particles in a fluidized bed. The agglomeration may be spontaneous or occur on short periods of settling.

A polymer may be inherently sticky due to its chemical or mechanical properties or pass through a sticky phase during the production cycle. Sticky polymers are also referred to as non-free flowing polymers because of their tendency to compact into agglomerates of much larger size than the original particles. Polymers of this type show acceptable fluidity in a gas phase fluidized bed reactor; however, once motion ceases, the additional mechanical force provided by the fluidizing gas passing through the distributor plate is insufficient to break up the agglomerates which form and the bed will not refluidize. In addition in stirred bed reactors particle agglomeration can seriously interfere with the mechanical mixing action in the reactor. These polymers are classified as those, which have a minimum bin opening for free flow at zero storage time of two feet and a minimum bin opening for free flow at storage times of greater than five minutes of 4 to 8 feet or more.

The present process includes adding a multicomponent antifoulant to the second reactor. As used herein, "multicomponent antifoulant" is a composition containing two or more components capable of inhibiting, preventing, or reducing reactor fouling: (i) agglomeration of the heterophasic copolymer and/or (ii) adherence of the heterophasic copolymer to the interior surfaces of the second polymerization reactor. Included as interior surfaces are polymerization reactor components such as surfaces of the reaction chamber, heat exchanger, compressor, piping, cycle pipe, reactor plate, and/or bottom head. The antifouling effectiveness of the multicomponent antifoulant—i.e., the degree of inhibition, prevention, or reduction of agglomeration/particle adherence—can be whole (i.e., complete prevention of fouling) or partial (i.e., a reduction in fouling) when compared to fouling for single component antifoulants and/or no antifoulants as dictated by the amount of multicomponent antifoulant used in conjunction with reactor process parameters.

In an embodiment, the multicomponent antifoulant is composed of (i) an activity limiting agent (ALA) and (ii) a selectivity control agent (SCA). In one embodiment, the multicomponent antifoulant may be a mixture of the ALA and SCA (i.e., a pre-mix), the mixture added to the second polymerization reactor. In another embodiment, the multicomponent antifoulant may be formed in the second polymerization reactor in situ, by separate addition of the ALA and separate addition of the SCA into the second polymerization reactor.

In an embodiment, the ALA may be a carboxylic acid ester, a diether, a diol ester, and combinations thereof. The carboxylic acid ester can be an aliphatic or aromatic, mono- or poly-carboxylic acid ester. Nonlimiting examples of suitable monocarboxylic acid esters include ethyl and methyl benzoate, p-methoxy ethyl benzoate, p-ethoxy methyl benzoate, p-ethoxy ethyl benzoate, ethyl acrylate, methyl methacrylate, ethyl acetate, p-chloro ethyl benzoate, p-amino hexyl benzoate, isopropyl naphthenate, n-amyl toluate, ethyl cyclohexanoate and propyl pivalate.

Nonlimiting examples of suitable polycarboxylic acid esters include dimethyl phthalate, diethyl phthalate, di-n-propyl phthalate, diisopropyl phthalate, di-n-butyl phthalate, diisobutyl phthalate, di-tert-butyl phthalate, diisoamyl phthalate, di-tert-amyl phthalate, dineopentyl phthalate, di-2-ethylhexyl phthalate, and di-2-ethyldecyl phthalate.

The aliphatic carboxylic acid ester may be a $C_4$-$C_{30}$ aliphatic acid ester, may be a mono- or a poly- (two or more) ester, may be straight chain or branched, may be saturated or unsaturated, and any combination thereof. The $C_4$-$C_{30}$ aliphatic acid ester may also be substituted with one or more Group 14, 15 or 16 heteroatom containing substituents. Nonlimiting examples of suitable $C_4$-$C_{30}$ aliphatic acid esters include $C_{1-20}$ alkyl esters of aliphatic $C_{4-30}$ monocarboxylic acids, $C_{1-20}$ alkyl esters of aliphatic $C_{8-20}$ monocarboxylic acids, $C_{1-4}$ alkyl mono- and diesters of aliphatic $C_{4-20}$ mono-carboxylic acids and dicarboxylic acids, $C_{1-4}$ alkyl esters of aliphatic $C_{8-20}$ monocarboxylic acids and dicarboxylic acids, and $C_{4-20}$ mono- or polycarboxylate derivatives of $C_{2-100}$ (poly)glycols or $C_{2-100}$ (poly)glycol ethers. In a further embodiment, the $C_4$-$C_{30}$ aliphatic acid ester may be isopropyl myristate, di-n-butyl sebacate, (poly)(alkylene glycol) mono- or diacetates, (poly)(alkylene glycol) mono- or di-myristates, (poly)(alkylene glycol) mono- or di-laurates, (poly)(alkylene glycol) mono- or di-oleates, glyceryl tri(acetate), glyceryl tri-ester of $C_{2-40}$ aliphatic carboxylic acids, and mixtures thereof. In a further embodiment, the $C_4$-$C_{30}$ aliphatic ester is isopropyl myristate or di-n-butyl sebacate.

In an embodiment, the activity limiting agent includes a diether. The diether can be a dialkyl ether represented by the following structure (I):

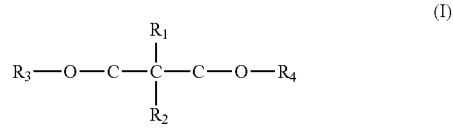

wherein $R_1$ to $R_4$ are independently of one another an alkyl, aryl or aralkyl group having up to 20 carbon atoms, which may optionally contain a group 14, 15, 16, or 17 heteroatom, and $R_1$ and $R_2$ may be a hydrogen atom. The dialkylether may be linear or branched, and may include one or more of the following groups: alkyl, cycloaliphatic, aryl, alkylaryl or arylalkyl radicals with 1-18 carbon atoms, and hydrogen.

In an embodiment, the activity limiting agent includes a succinate composition having the following structure (II):

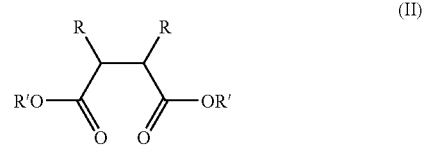

wherein R and R' may be the same or different, R and/or R' including one or more of the following groups: linear or branched alkyl, alkenyl, cycloalkyl, aryl, arylalkyl or alkylaryl group, optionally containing heteroatoms. One or more ring structures can be formed via one or both 2- and 3-position carbon atom.

In an embodiment, the activity limiting agent includes a diol ester as represented by the following structure (III):

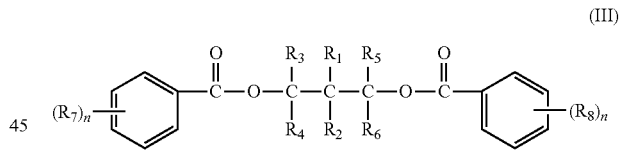

wherein n is an integer from 1 to 5. $R_1$ and $R_2$, may be the same or different, and each may be selected from hydrogen, methyl, ethyl, n-propyl, i-propyl, n-butyl, i-butyl, t-butyl, allyl, phenyl, or halophenyl group. $R_3$, $R_4$, $R_5$, $R_6$, $R_7$, and $R_8$, may be the same or different, and each may be selected from hydrogen, halogen, substituted, or unsubstituted hydrocarbyl having 1 to 20 carbon atoms. $R_1$-$R_6$ groups may optionally contain one or more heteroatoms replacing carbon, hydrogen or both, the hetero-atom selected from nitrogen, oxygen, sulfur, silicon, phosphorus and a halogen. $R_7$ and $R_8$, may be the same or different, and may be bonded to any carbon atom of the 2-, 3-, 4-, 5-, and 6-position of either phenyl ring.

The multicomponent antifoulant includes an SCA. In an embodiment, the SCA is one or more alkoxysilanes. The multicomponent antifoulant may include one or more alkoxysilanes having the general formula: $SiR_m(OR')_{4-m}$ where R independently each occurrence is hydrogen or a hydrocarbyl or an amino group optionally substituted with one or more substituents containing one or more Group 14, 15, 16, or 17 heteroatoms R contains up to 20 atoms not counting hydrogen and halogen R' is a $C_{1-20}$ alkyl group, and m is 0, 1, 2 or 3. In an embodiment, R is $C_{6-12}$ aryl, alkyl or aralkyl, $C_{3-12}$ cycloalkyl, $C_{3-12}$ branched alkyl, or $C_{3-12}$ cyclic amino group, R' is $C_{1-4}$ allyl, and m is 1 or 2. Nonlimiting examples of suitable silanes include dicyclopentyldimethoxysilane, di-tert-butyldimethoxysilane, methylcyclohexyldimethoxysilane, ethylcyclohexyldimethoxysilane, diphenyldimethoxysilane, diisopropyldimethoxysilane, di-n-propyldimethoxysilane, diisobutyldimethoxysilane, di-n-butyldimethoxysilane, cyclopentyltrimethoxysilane, isopropyltrimethoxysilane, n-propyltrimethoxysilane, n-propyltriethoxysilane, ethyltriethoxysilane, tetramethoxysilane, tetraethoxysilane, cyclopentylpyrrolidinodimethoxysilane, bis(pyrrolidino)dimethoxysilane, bis(perhydroisoquinoline) dimethoxysilane, dimethyldimethoxysilane, tetraethyl orthosilicate, tetramethyl orthosilicate, tetramethoxyethoxy orthosilicate, and any combination of the foregoing. In an embodiment, the silane composition is dicyclopentyldimethoxysilane, methylcyclohexyldimethoxysilane, or n-propyltrimethoxysilane, and any combination of thereof. In a further embodiment, the silane is dicyclopentyldimethoxysilane.

In an embodiment, the ALA and/or the SCA can be added into the reactor separately. In another embodiment, the ALA and the SCA can be mixed together in advance and then added into the reactor as a mixture. In the mixture, more than one ALA or more than one SCA can be used. In an embodiment, the mixture may be one or more of the following: dicyclopentyldimethoxysilane and isopropyl myristate, dicyclopentyldimethoxysilane and poly(ethylene glycol) laurate, dicyclopentyldimethoxysilane and isopropyl myristate and a polyglycol, methylcyclohexyldimethoxysilane and isopropyl myristate, n-propyltrimethoxysilane and isopropyl myristate, dimethyldimethoxysilane and methylcyclohexyldimethoxysilane and isopropyl myristate, dicyclopentyldimethoxysilane and n-propyltriethoxysilane and isopropyl myristate, and dicyclopentyldimethoxysilane and tetraethoxysilane and isopropyl myristate, and any combination of the foregoing.

In an embodiment, the ALA and the SCA are selected to form an odor-free heterophasic copolymer. In one embodiment, the multicomponent antifoulant includes a $C_{1-20}$ alkyl ester of an aliphatic $C_{8-20}$ monocarboxylic acid (such as isopropyl myristate) and an alkoxysilane, and the process forms an odor-free heterophasic copolymer.

The present process includes adding the multicomponent antifoulant to the second polymerization reactor and forming a heterophasic copolymer having an Fc value from about 10% to about 50%, or greater than 15% to about 50%.

The present process includes adding the multicomponent antifoulant to the second polymerization reactor at a rate such that the multicomponent antifoulant is present in the formant heterophasic copolymer at a concentration from about 1 ppm to about 200 ppm, or from about 5 ppm to about 100 ppm, or from about 10 ppm to about 50 ppm, or about 25 ppm. The concentration of the multicomponent antifoulant is based on the total weight of the heterophasic copolymer. The multicomponent antifoulant may be added to the second polymerization reactor intermittently or continuously. In an embodiment, the multicomponent antifoulant is added continuously. In a further embodiment, continuous addition of the multicomponent antifoulant into the second polymerization reactor proceeds to ensure a multicomponent antifoulant concentration from about 20 ppm to about 30 ppm, or about 25 ppm in the formant heterophasic copolymer.

In one embodiment, the process includes adding the multicomponent antifoulant at a rate such that the multicomponent antifoulant is present in the heterophasic copolymer in a concentration from about 10 ppm to about 50 ppm, and forming a heterophasic copolymer with an Fc value from greater than 15% to about 40%.

In an embodiment, the process includes inhibiting, with the multicomponent antifoulant, fouling within the second polymerization reactor. Applicants have surprisingly and unexpectedly discovered that addition of the multicomponent antifoulant to the second polymerization reactor improves reactor operability by inhibiting fouling (including sheeting, particle adherence, and/or particle agglomeration) in the second polymerization reactor. Direct addition of the multicomponent antifoulant to the second polymerization reactor enables the production of heterophasic copolymers with high Fc value (i.e., high rubber content). Applicants have further discovered that addition of the present multicomponent antifoulant directly into the second reactor provides greater antifouling capability compared to active polymers produced with an ALA/SCA mixture and subsequently introduced into the second reactor. Any residual ALA/SCA mixture present in the active polymer tends to be ineffective for inhibiting fouling in the second reactor for heterophasic copolymers with an Fc value greater than 10%, or greater than 15%.

In an embodiment, provision of the multicomponent antifoulant enables the production of heterophasic copolymers with an Fc value greater than about 15%, or greater than about 20%, or greater than about 30%, or from greater than 15% to about 50%, without reactor fouling and/or particle agglomeration. It has been surprisingly found that the multicomponent antifoulant does not negatively affect the properties of the formant heterophasic copolymer.

Moreover, utilization of the present multicomponent antifoulant synergistically provides antifouling capability while simultaneously providing improved reactor process control in the second reactor. In another embodiment, the present process includes inhibiting fouling in the second reactor and simultaneously controlling the amount of discontinuous phase present in the heterophasic copolymer with the multicomponent antifoulant.

The multi-modal nature of the multicomponent antifoulant provides enhanced process control capability. In an embodiment, adjustment of the addition rate or the feed rate of the multicomponent antifoulant into the second polymerization reactor can be utilized to control the amount of rubber phase produced in the second reactor.

In an embodiment, the addition of the multicomponent antifoulant into the second reactor may be adjusted to correspondingly adjust the Fc value of the formant heterophasic copolymer. In an embodiment, the process includes increasing the addition or otherwise increasing the amount of multicomponent antifoulant added into the second polymerization reactor and decreasing the Fc value of the heterophasic copolymer. In an embodiment, the process includes feeding or otherwise adding the multicomponent antifoulant to the second polymerization reactor such that the multicomponent antifoulant is present in the heterophasic copolymer in a concentration greater than 25 ppm, or from about 25 ppm to about 200 ppm, and forming a heterophasic copolymer with an Fc value less than about 40%, or less than about 30%, or less than 20%, or less than about 15%, or less than about 10%, or less than about 5%.

In an embodiment, the process includes decreasing the addition or otherwise decreasing the amount of multicomponent antifoulant added into the second polymerization reactor and increasing the Fc value of the heterophasic copolymer. In an embodiment, the process includes feeding or otherwise adding the multicomponent antifoulant to the second polymerization reactor such that the multicomponent antifoulant is present in the heterophasic copolymer at a concentration less than 25 ppm, or less than 25 ppm to about 0.1 ppm, or from less than 20 ppm to about 5 ppm, and forming a heterophasic copolymer with an Fc value from greater than about 20%, or greater than 20% to about 50%.

The ratio of ALA-to-SCA may vary. The multicomponent antifoulant may contain from about 0.1 mol % to about 99.9 mol % ALA and from about 99.9 mol % to about 0.1 mol % SCA (or any value or subrange therebetween). In an embodiment, the ALA and the SCA can be individually fed into the reactor to provide an in situ multicomponent antifoulant having from about 0.1 mol % to about 99.9 mol % of the ALA with from about 99.9 mol % to about 0.1 mol % of the SCA.

In an embodiment, the process includes adjusting the ALA:SCA ratio and controlling the amount of a discontinuous phase present in the heterophasic copolymer. Increasing the amount of ALA (and decreasing the amount of SCA) decreases the amount of rubber phase formed. Increasing the amount of SCA (decreasing the amount of ALA) increases the amount of rubber phase formed. For example, increasing the amount of ALA (thereby decreasing the amount of SCA) decreases the amount of discontinuous phase polymer produced.

In an embodiment, the active polymer is a propylene-based polymer such as a propylene homopolymer. The process includes contacting the active propylene homopolymer with ethylene (alone or in combination with propylene) in the second polymerization reactor to form a propylene impact copolymer. The process also includes adding the multicomponent antifoulant to the second polymerization reactor at a rate such that the multicomponent antifoulant is present in the propylene impact copolymer in a concentration from about 1 ppm to about 200 ppm, or from about 5 ppm to about 100 ppm, or from about 10 ppm to about 50 ppm. The concentration is based on the total weight of the propylene impact copolymer.

In one embodiment, the propylene impact copolymer includes a propylene homopolymer continuous phase in which a propylene/ethylene copolymer is dispersed (discontinuous phase).

In an embodiment, the propylene impact copolymer has an Fc value of about 1% to about 50%, or greater than about 10%, or greater than about 15%, or greater than about 20%, or greater than about 30%, or greater than about 40%.

In an embodiment, the propylene impact copolymer has an Ec value from about 0.1% to about 90%, or from about 1% to about 80, or from about 10% about 60%. As used herein, "ethylene content" ("Ec") is the weight percent of ethylene present in the discontinuous phase of the heterophasic polymer. The Ec value is based on the total weight of the discontinuous (or rubber) phase. In a further embodiment, the process includes inhibiting, with the multicomponent antifoulant, fouling in the second reactor of the polypropylene impact copolymer having an Fc value of greater than 15% and an Ec value from about 1% to about 80%.

In an embodiment, the process includes forming particles of the heterophasic copolymer and coating the particles with the multicomponent antifoulant. The particles can have a D50 value from about 0.001 inches to about 0.5 inches or from about 0.015 inches to about 0.05 inches. In another embodiment, the formed particles of the polypropylene impact copolymer have a D50 value of about 0.025 inches. As used herein, "D50" is the particle distribution such that 50% of the sample particle volume is above the stated particle size range.

Provision of the multicomponent antifoulant produces a heterophasic copolymer that does not foul the second reactor, does not adhere to the interior surfaces of the second reactor (i.e., does not adhere to the heat exchanger, cycle gas compressor, reactor plate, and/or bottom head of a gas phase polymerization reactor), and does not agglomerate. Not wishing to be bound by any particular theory, it is believed that the multicomponent antifoulant coats the interior surfaces of the second polymerization reactor and/or coats the formant heterophasic copolymer particles. In this way, the multicomponent antifoulant inhibits fouling such as particle agglomeration and/or particle surface adhesion.

In an embodiment, the presence of the multicomponent antifoulant in the second polymerization reactor advantageously provides enhanced process control of the (i) fluidized bed temperature, (ii) static activity within the reactor, and (iii) bed minus dew temperature control (maintaining the bed minus dew temperature from about 1° C. to about 6° C.) when compared to antifoulants having a single component.

The present disclosure provides another process for producing a copolymer. In an embodiment, a process for producing a copolymer is provided. The process includes introducing an active polymer from a first polymerization reactor into a second polymerization reactor. The active polymer is produced in a first polymerization reactor and introduced into the second polymerization reactor as previously disclosed. In the second reactor, the active polymer is contacted with at least one olefin under polymerization conditions to form particles of an impact copolymer in the second reactor. The process further includes adding a coating agent into the second polymerization reactor and coating the particles with the coating agent.

Each particle has an outer surface which defines or otherwise bounds an interior portion of the particle. As used herein, a "coating agent" is a substance that adheres to or otherwise binds to the outer surface of the formant heterophasic copolymer particles under polymerization conditions. The coating agent can be a liquid, a solid particulate, or a finely divided semi-solid material. The coating agent can be added in a pure form, in a solution form, or in a suspension form.

The coating agent contacts and adheres to the outer surface of the copolymer particles produced in the second reactor. The present coating agent inhibits reactor fouling by (i) coating the formant polymer particles while (ii) imparting no adverse properties to the formant copolymer particles. Thus, provision of the coating on the particles reduces reactor shutdown and increases production efficiency.

In an embodiment, the coating agent is selected from one or more of the following: a high molecular weight poly glycol, a dendrimer, and a high molecular weight polymer with an electron donating group, an SCA, an ALA, and any combination of the foregoing. In one embodiment, the coating agent is a high molecular weight ("HMW") polyglycol, alone or in combination with one or more additional components. As used herein, a "high molecular weight polyglycol" is a polyglycol having a molecular weight from about 500 to about 200,000. Nonlimiting examples of suitable HMW polyglycols include glycerols, mixed glycerides, poly(alkylene)glycols (i.e., ethylene glycol) poly(alkoxy)(alkylene) glycols (i.e., methoxypolyethylene glycol), and/or polyglycol ethers (such as $C_{2-100}$ polyglycol ethers) having a molecular weight from about 500 to about 200,000.

In another embodiment, the coating agent is a highly branched molecule, such as a dendrimer. A "dendrimer," (or a "dense star polymer") as used herein, is a polymer having at least three individual branches that radiate from a common core nucleus. The individual branches may or may not have terminal functional groups. In an embodiment, the branches include terminal functional groups. Nonlimiting examples of suitable functional groups for the dendrimer include the following groups: amino, hydroxy, mercapto, carboxy, alkenyl, allyl, vinyl, amido, halo, urea, oxiranyl, aziridinyl, oxazolinyl, imidazolinyl, sulfonato, phosphonato, isocyanato and isothiocyanato. Further nonlimiting examples of suitable dendrimers include one or more of the following: polyamidoamine dendrimers, phosphorus dendrimers, polylysine dendrimers, and polypropyleneimine dendrimers.

In an embodiment, the coating agent may a high molecular weight ("HMW") polymer which includes at least one electron donating group and has a molecular weight of at least about 300, or from about 300 to about 200,000. Nonlimiting examples of suitable HMW polymers with an electron donating group include tetrakismethylene(3,5-di-t-butyl-4-hydroxyhydrocinnamate)methane, octadecyl-3-(3',5'-di-tert-butyl-4-hydroxyphenyl)propionate, 2,2'-thiodiethylene bis [3-(3,5-di-tert-butyl-4-hydroxyphenyl)propionate], 2,2'-ethylidene-bis(4,6-di-tert-butylphenol), methylpropylidene) bis[4,6-xylenol], tris(3,5-di-tert-butyl-4-hydroxybenzyl) isocyanurate, 1,3,5-trimethyl-2,4,6-tris(3,5-di-tert-butyl-4-hydroxybenzyl)benzene, 2,2'-methylenebis(6-tert-butyl-4-methylphenol), 4,4'-butylidenebis(6-tert-butyl-3-methylphenol), poly(dicyclopentadiene-co-p-cresol), tris(4-tert-butyl-3-hydroxy-2,6-dimethylbenzyl) isocyanurate, triethylene glycol bis(3-tert-butyl-4-hydroxy-5-methylphenyl)propionate, 1,2-bis(3,5-di-tert-butyl-4-hydroxyhydrocinnamoyl) hydrazine, 3,3'-bis(3,5-di-tert-butyl-4-hydroxyphenyl)-n,n'-hexamethylenedipropionamide, 1,1,3-tris(2-methyl-4-hydroxy-5-tert-butylphenyl)butane, 4,4'-thiobis(6-tert-butyl-m-cresol), 2,2'-thiobis(6-tert-butyl-p-cresol), 2,2'-methylenebis[6-(1-methylcyclohexyl)-p-cresol], tetrakis(2,4-di-tert-butylphenyl)-1,1-biphenyl-4,4'-diylbisphosphonite, tris(2,4-di-tert-butylphenyl) phosphate, 3,9-bis(2,4-di-tert-butylphenoxy)-2,4,8,10-tetraoxa-3,9-diphosphaspiro[5.5]undecane, tris(nonylphenyl) phosphate, dioctadecyl 3,3'-thiodipropionate, didodecyl 3,3'-thiodipropionate, 2-(2H-benzotriazol-2-yl)-4-(tert-butyl)-6-(sec-butyl)phenol, 2-(3,5-di-tert-amyl-2-hydroxyphenyl)benzotriazole, 5-benzoyl-4-hydroxy-2-methoxybenzenesulfonic acid, 2-(5-chloro-2-benzotriazolyl)-6-tert-butyl-p-cresol, 2-(3,5-di-tert-butyl-2-hydroxyphenyl)-5-chlorobenzotriazole, 2-(2-hydroxy-5-tert-octylphenyl)benzotriazole, 2-hydroxy-4-n-octyloxybenzophenone, 2,2'-methylenebis[6-(benzotriazol-2-yl)-4-tert-octylphenol], poly-{[6-[(1,1,3,3-tetramethylbutyl)amino]-1,3,5-triazine-2,4-diyl][(2,2,6,6-tetramethyl-4-piperidyl)imino]-1,6-hexanediyl[(2,2,6,6-tetramethyl-4-piperidyl)imino]}, poly(n-hydroxyethyl-2,2,6,6-tetramethyl-4-hydroxy-piperidyl succinate), bis(2,2,6,6-tetramethyl-4-piperidyl) sebacate, bis(1,2,2,6,6-pentamethyl-4-piperidyl) sebacate, and any combination of the foregoing.

In an embodiment, the coating agent is not present in the interior portion of the particle. In other words, the particle interior is void of the coating agent. Not wishing to be bound by any particular theory, it is believed that the bulkiness of the foregoing coating agents prevents the coating agents from traveling into the pores/micro-pores of the impact copolymer particles. Surprisingly and unexpectedly, it has been found that the present coating agents have a bulkiness—molecule bulkiness and/or bulkiness in the coating agent's physical form (i.e., powder)—that maintains the coating agent on the exterior of the particle surface and simultaneously prevents travel and/or migration of the coating agent into the interior portion of the particle.

In an embodiment, the coating agent may be a mixture of two or more of the following: a high molecular weight poly glycol, a dendrimer, and a high molecular weight polymer with an electron donating group. Each component (when present) may be present in an amount from about 0.1 wt % to about 99.9 wt %, based on total weight of the coating agent.

In a further embodiment, the coating agent may include a silane in combination with one or more of the following: a high molecular weight poly glycol, a dendrimer, and a high molecular weight polymer with an electron donating group. Each component (when present) may be present in an amount from about 0.1 wt % to about 99.9 wt %, based on the total weight of the coating agent.

The coating agent may be added to the second reactor as a pre-mix or in situ as disclosed above. In one embodiment, the process includes mixing two or more members selected from a high molecular weight polyglycol, a dendrimer, a high molecular weight polymer with an electron donating group, and an a silane, and forming the coating agent. In a further embodiment, mixture of the coating agent components occurs before the coating agent is introduced in the second reactor.

The coating agent may coat a portion of the outer surface for each particle. In another embodiment, the coating agent may coat the entire, or substantially the entire, outer surface of one or more copolymer particles. In an embodiment, the process includes applying the coating agent to the entire outer surface of at least one particle. This completely surrounds, or substantially surrounds, at least one particle with the coating. In this sense, the coating encases the entire outer surface, or encases substantially the entire outer surface, of at least one particle. In a further embodiment, the coating agent is added to the polymerization reactor in a sufficient amount and manner to coat the entire outer surface, or substantially the entire surface, of each formant particle of heterophasic copolymer.

In an embodiment, the coating agent is composed solely of one or more high molecular weight polyglycol(s). In another embodiment, the coated impact copolymer particles are odor free.

The coating agent may be added intermittently or continuously to the second polymerization reactor. In an embodiment, the process includes continuously feeding the coating agent into the second polymerization reactor.

In an embodiment, the process includes adding the coating agent to the second polymerization reactor at a rate such that the coating agent is present on the surface of the heterophasic copolymer in a concentration from about 1 ppm to about 200 ppm, or from about 5 ppm to about 100 ppm, or from about 10 ppm to about 50 ppm.

In an embodiment, the particles of the impact copolymer have a D50 value from about 0.001 in to about 0.5 in, or from about 0.015 in to about 0.05 in, or about 0.025 in.

In an embodiment, the process includes adding the coating agent to the second polymerization reactor to form a coating having a thickness from about 0.01 μm to about 200 μm, or from about 0.1 μm, to about 100 μm, or from about 1 μm to about 10 μm.

In an embodiment, the continuous phase can be a propylene-based polymer such as a propylene homopolymer or a propylene/olefin copolymer. In one embodiment, the propylene-based polymer is a propylene homopolymer.

In an embodiment, the discontinuous phase can be an ethylene-based polymer or a propylene-based polymer. Nonlimiting examples of suitable ethylene-based polymers include ethylene homopolymer, an ethylene/olefin copolymer and an ethylene/propylene copolymer. Nonlimiting examples of suitable propylene-based polymers include propylene/olefin copolymers and propylene/ethylene copolymers.

In an embodiment, the particles include a continuous phase that is a propylene homopolymer and a discontinuous phase of a propylene and ethylene copolymer. It is understood that the ethylene content of the discontinuous phase will determine whether the discontinuous phase is a propylene/ethylene copolymer (majority weight percent of units derived from propylene) or an ethylene/propylene copolymer (majority weight percent of units derived from ethylene). The discontinuous phase has an Ec value from about 0.1 wt % to about 80 wt %.

In an embodiment, the process includes forming particles of an impact copolymer composed of propylene/ethylene copolymer dispersed in propylene homopolymer. The impact copolymer has an Fc value from about 1% to about 50%. In another embodiment, the impact copolymer particles have an Fc value greater than about 10%, or greater than about 15%, or greater than about 20%, or greater than about 30%, or greater than about 40%. In a further embodiment, the impact copolymer particles have an Fc value greater than about 15% to about 40%.

In an embodiment, the propylene and ethylene copolymer of the impact copolymer has an Ec value from about 0.1% to about 80%, or from about 1% to about 60%, or from about 2% to about 50%, or from about 3% to about 30%.

Although the disclosure of the coating agent is directed to addition to a second polymerization reactor, it is understood that the coating agent may be added to a first polymerization reactor that is used in a single stage polymerization process (single reactor) and/or a multiple stage polymerization process (multiple reactors).

The present disclosure provides another process. In an embodiment, a polymerization process is provided which includes introducing an active polymer comprising at least 6 wt % polymer fines into a polymerization reactor. The process includes contacting the active polymer with at least one olefin under polymerization conditions, and forming a heterophasic copolymer having an Fc value of at least 30 wt %. The formed heterophasic copolymer has a flowability index greater than about 0.65, or greater than about 0.70.

In an embodiment, the polymer fines are propylene homopolymer.

The heterophasic copolymer may be any heterophasic copolymer as disclosed herein including a high-rubber polymer and/or a sticky polymer. In an embodiment, the heterophasic copolymer is an impact copolymer comprising a propylene-based polymer continuous phase and a propylene/ethylene copolymer discontinuous phase, the impact copolymer having an Fc value of at least 30%, or at least 30% to about 50%, and an Ec value from about 10% to about 50%, or from about 30% to about 40%.

In an embodiment, the process includes inhibiting, with the polymer fines, agglomeration of the heterophasic copolymer in the polymerization reactor. Not wishing to be bound by any particular theory, it is believed that particle stickiness is influenced by the rubber composition, thickness, and/or coverage on the particle outer surface. Once a critical condition is reached, the sticky particles will stick to other sticky or non-sticky particles and form agglomerations. The level of particle agglomeration depends on the quantity and size of the sticky particles and the non-sticky particles. The polymer fines attach to the outer surface of the sticky particles and act as an insulating layer. This insulating layer of polymer fines prevents particle agglomeration.

In an embodiment, the process includes attaching a plurality of polymer fines to at least one particle of the heterophasic copolymer. The polymer fines are less than about 200 microns in size, or less than about 125 microns in size. The polymer fines attach to the rubber portions of the heterophasic copolymer. The polymer fines cover the rubber portions of the impact copolymer on the outer surface of the particle. The polymer fines attach or otherwise adhere to the outer surfaces of the formant heterophasic copolymer particles. In an embodiment, the polymer fines attach to and cover all, or substantially all, the rubber-rich portions of the heterophasic copolymer particle. The attached polymer fines perform as an insulating layer to inhibit, or completely prevent, agglomeration of the particles of heterophasic copolymer. Surprisingly and unexpectedly, it has been found that the polymer fines do not detach from the sticky rubber phase. Not bounded by any particular theory, it is believed that the polymer fines do not break off of the sticky particles due to their light weight and the absence of cracks in the polymer fines.

In an embodiment, the majority of the polymer fines are rubber-free, or substantially rubber-free. The polymer fines may be a propylene-based polymer as formed in the first reactor, for example. In a further embodiment, the polymer fines are propylene homopolymer. Not wishing to be bound by any particular theory, it is believed that the rubber-free nature of the polymer fines may be because the polymer fines stay in the first reactor longer than the bulk particles and therefore have lower activity when the polymer fines arrive in the second reactor. In an embodiment, the bulk particles are from about 150 microns to about 3500 microns in size.

Surprisingly and unexpectedly, it has been found that an amount of at least 6 wt % polymer fines provides the heterophasic copolymers acceptable flowability. The particles of the heterophasic copolymers exhibit a flowability index of greater than 0.65, or great than or equal to 0.70, or from about 0.70 to about 1.0. The process advantageously provides flowability to rubber-rich and/or sticky particles without the need of a flowability additive, i.e., without the need of addition of an inert particulate material. In other words, flowability is achieved for rubber-rich and/or sticky particles without the need to add a foreign flow aid. Moreover, the present process requires no additional production steps or methodology to achieve flowability of rubber-rich particles. Thus, the present process requires no additional equipment.

Each process for producing a copolymer may comprise one or more embodiments disclosed herein.

The present disclosure provides a composition. In an embodiment, a particle of an impact copolymer is provided. The particle of the impact copolymer includes a continuous phase and a discontinuous phase dispersed within the continuous phase. A coating is present on an outer surface of the particle. The particle may be formed by way of any foregoing polymerization and coating process disclosed herein. Although the disclosure is directed to a particle, it is understood that the disclosure applies to one, a plurality of, or all the particles formed by way of any polymerization process disclosed herein.

In an embodiment, the particle of the impact copolymer may include one or more embodiments of the formant coated particles of heterophasic copolymer produced by the foregoing process utilizing the coating agent.

In an embodiment, the coating is formed from the coating agent as disclosed herein.

In an embodiment, the coating on the particle of impact copolymer is selected from a high molecular weight polyglycol, a dendrimer, a high molecular weight polymer with an electron donating group, an alkoxysilane, and any combination thereof.

In an embodiment, the coating surrounds substantially the entire outer surface of the particle of impact copolymer.

In an embodiment, the coating on the particle of impact copolymer has a thickness from about 0.01 µm to about 200 µm.

In an embodiment, the continuous phase of the impact copolymer is selected from a propylene homopolymer, a propylene/olefin copolymer, and a propylene/ethylene copolymer.

In an embodiment, the discontinuous phase of the impact copolymer is selected from an ethylene homopolymer, an ethylene/olefin copolymer and a propylene/ethylene copolymer.

In an embodiment, the discontinuous phase of the impact copolymer includes ethylene. The discontinuous phase has an Ec value from about 1 wt % to about 80 wt %.

In an embodiment, the impact copolymer has an Fc value from about 1% to about 50%, or greater than 15% to about 50%.

In an embodiment the particle of the impact copolymer has an interior portion defined by the particle exterior surface (or particle outer surface) as disclosed above. The interior portion of the particle is void of the coating and/or the coating agent.

In an embodiment, the particle of the impact copolymer has a diameter from about 0.015 in to about 0.05 in.

The coated particles of heterophasic copolymer and/or the coated particles of impact copolymer may comprise one or more embodiments disclosed herein.

In an embodiment, a particle of an impact copolymer is provided. The particle includes a discontinuous phase dispersed within a continuous phase. The continuous phase is composed of a propylene-based polymer. The impact copolymer having an Fc value greater than 30%. At least one polymer fines is attached to an outer surface of the impact copolymer particle. In an embodiment, the polymer fines are attached to a rubber-rich portion of the particle.

In an embodiment, a plurality of impact copolymer particles is provided. The plurality of the impact copolymer particles have a flowability index greater than about 0.65, or greater than 0.70, or from about 0.7 to about 1.0.

In an embodiment, the discontinuous phase comprises a propylene/ethylene copolymer. The discontinuous phase has an Ec value from about 10% to about 50%.

In an embodiment, the particle(s) is/are a sticky polymer and/or a rubber-rich polymer.

In an embodiment, polymer fines cover all, or substantially all, the surface area where the discontinuous phase is exposed from the outer surface of the particle. In other words, The polymer fines cover all, or substantially all, of the rubber-rich or sticky areas of the particle.

The particle(s) of impact copolymer may comprise one or more embodiments disclosed herein.

Any of the foregoing antifoulant compositions may be added in the first and/or second polymerization reactor along with the fines-containing polymer.

Definitions

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

Any numerical range recited herein, includes all values from the lower value and the upper value, in increments of one unit, provided that there is a separation of at least two units between any lower value and any higher value. As an example, if it is stated that a compositional, physical or other property, such as, for example, molecular weight, melt index, etc., is from 100 to 1,000, it is intended that all individual values, such as 100, 101, 102, etc., and sub ranges, such as 100 to 144, 155 to 170, 197 to 200, etc., are expressly enumerated in this specification. For ranges containing values which are less than one, or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this application. In other words, any numerical range recited herein includes any value or subrange within the stated range. Numerical ranges have been recited, as discussed herein, in reference to density, weight percent of component, molecular weights and other properties.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition," as used herein, includes a mixture of materials which comprise the composition, as well as reaction products and decomposition products formed from the materials of the composition.

The term "polymer" is a macromolecular compound prepared by polymerizing monomers of the same or different type. "Polymer" includes homopolymers, copolymers, terpolymers, interpolymers, and so on. The term "interpolymer" means a polymer prepared by the polymerization of at least two types of monomers or comonomers. It includes, but is not limited to, copolymers (which refer to polymers prepared from two different types of monomers), terpolymers (which refers to polymers prepared from three different types of monomers), tetrapolymers (which refers to polymers prepared from four different types of monomers), and the like.

The term "interpolymer," as used herein, refers to polymers prepared by the polymerization of at least two different types of monomers. The generic term interpolymer thus includes copolymers, usually employed to refer to polymers prepared from two different monomers, and polymers prepared from more than two different types of monomers.

The term, "ethylene-based polymer," as used herein, refers to a polymer that comprises a majority weight percent polymerized ethylene monomer (based on the total weight of polymerizable monomers), and optionally may comprise at least one polymerized comonomer.

The term, "propylene-based polymer," as used herein, refers to a polymer that comprises a majority weight percent polymerized propylene monomer (based on the total amount of polymerizable monomers), and optionally may comprise at least one (or more) polymerized comonomer(s).

The term, "propylene/ethylene copolymer," as used herein, refers to a polymer that comprises a majority weight percent polymerized propylene monomer (based on the total amount of polymerizable monomers), polymerized ethylene monomer (second predominant monomer), and, optionally, at least one other α-olefin monomer.

The term "heteroatom" refers to an atom other than carbon or hydrogen. Preferred heteroatoms include: F, Cl, Br, N, O, P, B, S, Si, Sb, Al, Sn, As, Se and Ge.

The terms, "hydrocarbyl" and "hydrocarbon" refer to substituents containing only hydrogen and carbon atoms, including branched or unbranched, saturated or unsaturated, cyclic, polycyclic or noncyclic species. Examples include alkyl-, cycloalkyl-, alkenyl-, alkadienyl-, cycloalkenyl-, cycloalkadienyl-, aryl-, and alkynyl-groups. "Substituted hydrocarbyl" and "substituted hydrocarbon" refer to a hydrocarbyl group that is substituted with one or more nonhydrocarbyl substituent groups. The terms, "heteroatom containing hydrocarbyl," "heterohydrocarbyl" and like terms refer to groups in which at least one atom other than hydrogen or carbon is present along with one or more carbon atom and one or more hydrogen atoms.

As used herein the term "aromatic" refers to a polyatomic, cyclic, conjugated ring system containing $(4\delta+2)\pi$-electrons, wherein $\delta$ is an integer greater than or equal to 1. The term "fused" as used herein, with respect to a ring system containing two or more polyatomic, cyclic rings, means that with respect to at least two rings thereof, at least one pair of adjacent atoms is included in both rings. The term "aryl" refers to a monovalent aromatic substituent, which may be a single aromatic ring or multiple aromatic rings, which are fused together, linked covalently, or linked to a common group such as a methylene or ethylene moiety. Examples of aromatic ring(s) include phenyl, naphthyl, anthracenyl, and biphenyl, among others.

"Substituted aryl" refers to an aryl group in which one or more hydrogen atoms, bound to any carbon, is replaced by one or more functional groups, such as alkyl, substituted alkyl, cycloalkyl, substituted cycloalkyl, heterocycloalkyl, substituted heterocycloalkyl, halogen, alkylhalos (for example, $CF_3$), hydroxy, amino, phosphido, alkoxy, amino, thio, nitro, and both saturated and unsaturated cyclic hydrocarbons, which are fused to the aromatic ring(s), linked covalently or linked to a common group, such as a methylene or ethylene moiety. The common linking group may also be a carbonyl, as in benzophenone, or oxygen, as in diphenylether, or nitrogen, as in diphenylamine.

Test Methods

Flowability Index: The flowability of polymer powder is measured by a Sotax Index (via FT-300 Flowability Tester). The Flowability Tester measures the solid flow rate passing a fixed opening by gravity under different vibration levels. The vibration is applied before and during the particle discharge. The flow rate results are then averaged and compared with those of a standard easy-flow powder (such as Ottowa Sand) to get a normalized Flowability Index between 0 and 1. An index value of 1 indicates perfect flow while an Index value of 0 indicates no flow. The higher the Sotax Index, the better the flowability of the powder. A Sotax Index of greater than or equal to is typically required for an acceptable commercial process.

Particle Size: Particle size and particle size distribution are measured by a standard sieving test set. Anti-static agent is added to the sample before the sieving test. The sieve set includes the standard sieves of US 6 mesh, US 10 mesh, US 18 mesh, US 60 mesh, US 120 mesh, US 200 mesh and Pan. The particles passing US 120 mesh (i.e., particles smaller than 0.0049 inch) are considered polymer fines. Different averaged particle sizes can be obtained from the sieving test, including the commonly used weight-averaged particle size (APS).

By way of example and not limitation, examples of the present disclosure will now be given.

EXAMPLE 1

Two polypropylene fluidized bed reactors are connected in series to produce a propylene impact copolymer. The propylene impact copolymer includes propylene homopolymer produced in the first reactor (Reactor 1) and propylene/ethylene copolymer produced in the second reactor (Reactor 2). The catalyst system is a Ziegler-Natta supported catalyst together with an aluminum alkyl activator and an external donor mixture (selectivity control agent). Hydrogen is fed to both reactors to control melt flow. The selectivity control agent (SCA) fed to Reactor 1 includes a mixture of 60 mol % isopropyl myristate and 40 mol % dicyclopentyldimethylsilane. A multicomponent antifoulant including 95 mol % isopropyl myristate and 5 mol % dicyclopentyldimethylsilane is fed to Reactor 2 to suppress fouling and to control rubber content (Fc). Table 1 shows reactor conditions for five tests (A-E). Tests A-E show increasing amounts of multicomponent antifoulant (MAF-1) are fed to Reactor 2. The MAF-1 fed to Reactor 2 increases from 27.8 ppm (parts per million of MAF-1 by total weight of propylene impact copolymer produced) to 101.4 ppm and rubber content (Fc) decreases from 33.5 wt % to 13.1 wt % (Fc wt % based on total weight of the propylene impact copolymer). The presence of MAF-1 prevents fouling in Reactor 2 for Tests A-E.

TABLE 1

| Test | A | B | C | D | E |
|---|---|---|---|---|---|
| Part | 7 | 7 | 7 | 7 | 7 |
| Drum Number | 2325 | 2329 | 2336 | 2340 | 2347 |
| Rx1 Temperature (° C.) | 67.0 | 67.0 | 67.0 | 67.0 | 67.0 |
| Rx1 H2/C3 molar ratio | 0.01506 | 0.01318 | 0.01232 | 0.01103 | 0.01098 |
| Rx1 Al/Ti molar ratio | 50 | 48 | 46 | 53 | 54 |
| Rx1 Al/SCA molar ratio | 2.8 | 2.7 | 2.6 | 3.0 | 3.0 |
| Rx1 Bed Weight (lb) | 68 | 67 | 67 | 69 | 68 |
| Rx1 Productivity (lb/lb) | 24,722 | 25,723 | 30,695 | 31,880 | 30,695 |

TABLE 1-continued

| Test | A | B | C | D | E |
|---|---|---|---|---|---|
| Rx1 Melt Flow (g/10 min) | 4.2 | 4.0 | 2.9 | 2.9 | 2.6 |
| Rx1 Xylene Solubles (wt %) | 1.4 | 1.4 | 1.4 | 1.4 | 1.4 |
| Rx2 Temperature (° C.) | 70.0 | 70.0 | 70.0 | 70.0 | 70.0 |
| Rx2 propylene partial pressure psi | 63.8 | 50.7 | 50.7 | 50.1 | 50.1 |
| Rx2 C3/C2 molar ratio | 3.0 | 2.9 | 2.9 | 2.9 | 3.0 |
| Rx2 H2/C3 molar ratio | 0.02990 | 0.02750 | 0.02850 | 0.02740 | 0.02510 |
| Rx2 Bed Weight (lb) | 73 | 72 | 72 | 73 | 72 |
| Rx 2 MAF-1 concentration (ppm) | 27.8 | 46.7 | 60.3 | 74.5 | 101.4 |
| Fc (wt %) | 33.5 | 26.0 | 24.3 | 18.2 | 13.1 |
| Ec (wt %) | 41.1 | 42.4 | 41.4 | 44.3 | 44.8 |
| Rx2 Melt Flow (g/10 min) | 0.59 | 1.17 | 0.82 | 1.22 | 1.39 |

EXAMPLE 2

Two polypropylene fluidized bed reactors are connected in series to produce propylene impact copolymer. The propylene impact copolymer includes propylene homopolymer produced in the first reactor (Reactor 1) and propylene/ethylene copolymer produced in the second reactor (Reactor 2). The catalyst system is a Ziegler-Natta supported catalyst together with an aluminum alkyl activator and an external donor mixture (selectivity control agent). Hydrogen is fed to both reactors to control melt flow. The selectivity control agent (SCA) fed to Reactor 1 includes a mixture of 60 mol % isopropyl myristate and 40 mol % dicyclopentyldimethylsilane. A multicomponent antifoulant including 95 mol % isopropyl myristate and 5 mol % n-propyltrimethylsilane is fed to Reactor 2 to suppress fouling and to control rubber content (Fc). Table 2 shows reactor conditions for three tests (F-H). For tests F-H, increasing amounts of multicomponent antifoulant (MAF-2) are fed to Reactor 2. The MAF-2 fed to Reactor 2 increases from 87.6 ppm (parts per million of MAF-2 by total weight of propylene impact copolymer produced) to 140.1 ppm and rubber content (Fc) decreases from 20.8 wt % to 15.1 wt % (Fc wt % based on total weight of the propylene impact copolymer). The presence of MAF-2 prevents fouling in Reactor 2 for Tests F-H.

TABLE 2

| | Test | | |
|---|---|---|---|
| | F | G | H |
| Part | 4 | 4 | 4 |
| Drum Number | 2183 | 2185 | 2191 |
| Rx1 Temperature (° C.) | 67.0 | 67.0 | 67.0 |
| Rx1 H2/C3 molar ratio | 0.04096 | 0.04002 | 0.03910 |
| Rx1 Al/Ti molar ratio | 49 | 48 | 51 |
| Rx1 Al/SCA molar ratio | 2.0 | 1.9 | 2.1 |
| Rx1 Bed Weight (lb) | 70 | 69 | 69 |
| Rx1 Productivity (lb/lb) | 20,929 | 21,645 | 17,537 |
| Rx1 Melt Flow (g/10 min) | 7.9 | 8.0 | 7.6 |
| Rx1 Xylene Solubles (wt %) | 1.3 | 1.2 | 1.0 |
| Rx2 Temperature (° C.) | 70.0 | 70.0 | 70.0 |
| Rx2 propylene partial pressure psi | 100.0 | 100.4 | 99.8 |
| Rx2 C3/C2 molar ratio | 3.5 | 3.3 | 3.1 |
| Rx2 H2/C3 molar ratio | 0.02500 | 0.02360 | 0.02450 |
| Rx2 Bed Weight (lb) | 70 | 70 | 70 |
| Rx 2 MAF-2 concentration (ppm) | 87.6 | 116.4 | 131.3 |
| Fc (wt %) | 20.8 | 16.2 | 13.2 |
| Ec (wt %) | 39.0 | 40.4 | 42.3 |
| Rx2 Melt Flow (g/10 min) | 3.82 | 3.93 | 3.67 |

EXAMPLE 3

Fines

SEM-BEI—Reactor powder cross sections are prepared by adding a high concentration of powder particles to Epofix epoxy resin. The resin and powder mixture are out gassed in a vacuum bell jar to remove excess air and try an infiltrate the polymer particles with resin. The resin-powder mixtures are placed in a flat embedding mold and allowed to cure at 38° C. for 16 hrs. After curing, the samples are removed from the mold and trimmed to an appropriate size for ultramicrotomy (~3 mm×2 mm). The trimmed blocks are cryopolished prior to staining by removing sections from the blocks at −60° C. to prevent smearing of the elastomer particles. The cryo-polished blocks were stained with the vapor phase of an aqueous ruthenium tetraoxide solution for 3 hrs at ambient temperature. The staining solution is prepared by weighing 0.2 g of ruthenium (III) chloride hydrate (RuCl3×H2O) into a glass bottle with a screw lid and adding 10 ml of 5.25% aqueous sodium hypochlorite to the jar. The samples are placed in the glass jar using a glass slide having double sided tape. The slide is placed in the bottle in order to suspend the blocks about 1 inch above the staining solution and exposed to RuO4 vapors for 3 hrs. The stained blocks are faced-off by removing sections of approximately 1 micrometer in thickness using a diamond histology knife at ambient temperature on a Leica UC6 microtome until only clear epoxy remained with stained polymer particles. The polished blocks are mounted on aluminum sample mounts, ground with carbon paint and sputtered with a gold-palladium plasma for 30 seconds to render them conductive for SEM analysis.

Technique

SEM-BEI—A Hitachi S-4100 is used at a 20 kV accelerating voltage under backscattered electron imaging (BEI) to capture digital images using NIH digital imaging software. The images are post processed using Adobe Photoshop 7.0.

OM—A Wild M10 stereo microscope is used in reflectance mode for low magnification views of the polymer particles which are dispersed in a Petri dish. Images are captured using a Nikon DXM-1200 digital camera under fluorescence illumination and post processed using Adobe Photoshop 7.0.

FIGS. 1-3 are SEM micrographs of impact copolymer. As rubber load (Fc>30) increases agglomeration increases. Also, at similar rubber load (Fc>30), impact copolymer with low fines (LF) (FIG. 2) has more agglomeration than impact copolymer with fines (FIG. 1). Arrows in FIG. 2 indicate agglomeration.

Figure 5:
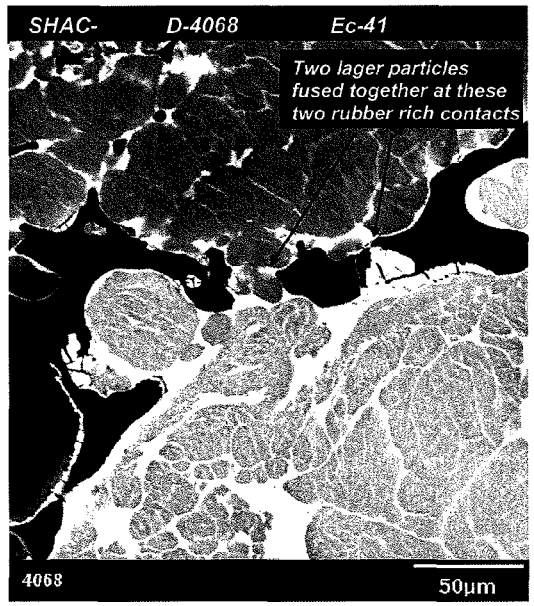
FIG. 5 is an SEM-BEI image along a sectional view of agglomerated polymer particles.

FIG. 4 is an SEM-BEI image of the impact copolymer of FIG. 1. FIG. 5 is an SEM-BEI image of the impact copolymer of FIG. 2. FIG. 4 shows fines adhering to the impact copolymer particle surface and thereby reducing agglomeration. The low fines impact copolymer (FIG. 5) has fewer fines allowing agglomeration to occur.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A process for producing a copolymer comprising:
   introducing an active polymer from a first polymerization reactor into a second polymerization reactor;
   contacting the active polymer with at least one olefin under polymerization conditions in the second polymerization reactor to form a heterophasic copolymer that is a sticky polymer;
   continuously adding a multicomponent antifoulant directly to the second polymerization reactor at a rate such that the multicomponent antifoulant is present in the heterophasic copolymer in a concentration from about 25 ppm to about 200 ppm; and
   inhibiting, with the multicomponent antifoulant, fouling within the second polymerization reactor; and
   forming a sticky polymer having an Fc greater than 30% and a minimum bin opening for free flow at zero storage time of 2 feet.

2. The process of claim 1 comprising continuously adding the multicomponent antifoulant such that the multicomponent antifoulant is present in the heterophasic copolymer in a concentration of about 25 ppm.

3. The process of claim 1 wherein decreasing the amount of multicomponent antifoulant present in the heterophasic copolymer increases the Fc value of the heterophasic copolymer.

4. The process of claim 1 comprising forming a propylene impact copolymer with an Ec value from about 1% to about 80% and inhibiting fouling of the propylene impact copolymer in the second polymerization reactor.

5. The process of claim 1 wherein the multicomponent antifoulant comprises an activity limiting agent (ALA) and a selectivity control agent (SCA), the process comprising increasing the ratio of ALA to SCA to decrease the Fc value of the heterophasic copolymer.

6. The process of claim 1 comprising adding a multicomponent antifoulant comprising isopropyl myristate.

7. The process of claim 1 comprising forming a propylene impact copolymer having an Ec value from about 10 wt % to about 60%.

8. The process of claim 1 comprising forming a heterophasic copolymer having an Ec value greater than about 30 wt % to about 50%.

9. The process of claim 1 comprising forming a heterophasic copolymer that is a high rubber copolymer having an Fc value from greater than 30% to 50%.

10. The process of claim 1 comprising preventing, with the multicomponent antifoulant, adhesion on second polymerization reactor components selected from the group consisting of reactor inner sidewalls, piping, heat exchanger, distributor plate, compressor, and combinations thereof.

11. The process of claim 1 comprising preventing, with the multicomponent antifoulant, agglomeration of the sticky polymer.

12. The process of claim 1 comprising forming particles of the heterophasic copolymer; and
   coating the particles with the multicomponent antifoulant.

13. The process of claim 1 comprising coating, with the multicomponent antifoulant, interior surfaces of the second polymerization reactor and preventing adhesion of the heterophasic copolymer to the interior surfaces.

* * * * *